United States Patent [19]

Vora et al.

[11] Patent Number: 5,075,419

[45] Date of Patent: Dec. 24, 1991

[54] NOVEL POLYBENZIMIDAZOLONE POLYMERS BASED HEXAFLUORO AROMATIC TETRAAMINES

[75] Inventors: Rohitkumar H. Vora, Westfield; Chen, Sr. Paul N., Gillette; Joseph D. Menczel, West Paterson, all of N.J.

[73] Assignee: Hoechst Celanese Corp., Somerville, N.J.

[21] Appl. No.: 505,742

[22] Filed: Apr. 6, 1990

[51] Int. Cl.[5] .................. C08G 69/42; C08G 69/26; C08G 8/02; C08G 63/00

[52] U.S. Cl. .................. 528/353; 528/125; 528/128; 528/183; 528/186; 528/337; 528/341; 528/342; 528/344

[58] Field of Search .............. 528/125, 128, 183, 186, 528/341, 342, 337, 344, 353

[56] References Cited

U.S. PATENT DOCUMENTS

| | | | |
|---|---|---|---|
| 3,509,108 | 4/1970 | Prince | 528/342 |
| 3,686,149 | 8/1972 | Ohfuji | 528/342 |
| 4,312,976 | 1/1982 | Choe | 528/342 |

FOREIGN PATENT DOCUMENTS

| | | | |
|---|---|---|---|
| 527453 | 8/1977 | U.S.S.R. | 528/342 |

*Primary Examiner*—John Kight, III

*Assistant Examiner*—T. Mosley

*Attorney, Agent, or Firm*—J. M. Hunter, Jr.

[57] ABSTRACT

This invention discloses new polybenzimidazolone polymers produced by the reaction of a hexafluoro aromatic tetraamine with a dianhydride reactant. These hexafluoro polybenzimidazolone polymers based on an aromatic hexafluoro tetraamine show improved solubility, easy processability, low moisture uptake, high thermal stability, resistance to solvent and other improvements over conventional polybenzimidazolone polymers.

1 Claim, No Drawings

NOVEL POLYBENZIMIDAZOLONE POLYMERS BASED HEXAFLUORO AROMATIC TETRAAMINES

BACKGROUND OF THE INVENTION

1. Field of Invention

This invention relates to polybenzimidazolone polymers and a process for their production. More particularly this invention relates to polybenzimidazolone polymers produced by a process using hexafluoro aromatic tetraamines.

2. Prior Art

Polybenzimidazoles are a group of nonflammable polymers which may be formed into fibers, films and membranes having outstanding thermal, physical and chemical stability. Processes for their production are disclosed, for example, in U.S. Re. 26,065 and U.S. Pat. Nos. 3,313,783, 3,509,108, 3,555,389, 3,433,772, 3,408,336, 3,549,603, 3,708,439, 4,154,919 and 4,312,976. (All patents mentioned herein are incorporated by reference).

Conventional polybenzimidazoles have been produced by the reaction of at least one aromatic tetraamine with a dicarboxylic acid, an ester of a dicarboxylic acid or a dicarboxylic acid halide. For example, in U.S. Pat. No. 2,895,948, polybenzimidazoles are prepared by the following condensation reaction:

X $HOOC(CH_2)_n-COOH$ +

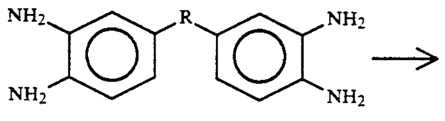

X

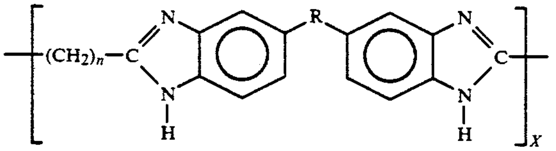

wherein R is a group of the class consisting of diphenyl bonds and divalent hydrocarbon radicals and n is from 4 to 8. For other conventional process for the production of polybenzimidazole polymers, see for example U.S. Pat. No. 4,814,530, 4,431,796 and 4,414,383.

While polybenzimidazole polymers produced by the methods disclosed above have been quite useful, they possess certain deficiencies in their processability, solubility, resistance to moisture absorption, tractability and flammability. One method of improving these characteristics has been the replacement of the imidazole hydrogen with less reactive substituents to produce N-substituted polybenzimidazole polymers. See for example U.S. Pat. No. 4,579,915, and 4,377,546.

Another method of improving the polybenzimidazole polymers is to prepare substituted polybenzimidazole polymers. For example, a vast array of substituted tetraamino heterocyclic compounds useful in the preparation of substituted polybenzimidazole polymers are disclosed in U.S. Pat. No. 3,943,125. Although many types of substituted tetraamino compounds are disclosed in the '125 patent, the use of a hexafluoro-substituted reactant to produce substituted polybenzimidazolone compound is not disclosed.

Another method of improving the performance of polybenzimidazole polymers is to modify their structure, such as by producing polybenzimidazolone polymers. The original process for the production of polybenzimidazolone polymers was disclosed in Marvel, C.S., *Journal of Polymer Science, Part A,* (3), p. 3549 (1965). That article discloses the reaction of a biphenyl tetraamine with a biphenyl dianhydride to produce a polybenzimidazolone polymer.

U.S. Pat. No. 4,260,652 discloses a process for producing a permselective composite membrane wherein a significant number of polybenzimidazolone polymers are disclosed. See for example, column 33 through 44. The polybenzimidazolones disclosed may or may not have bridging members selected from the group consisting of $$-O-,\ -SO_2-,\ -CO-,\ -CH_2-,\ \text{and}\ -\underset{CH_3}{\overset{CH_3}{\underset{|}{\overset{|}{C}}}}-$$

Although, there are a significant number of polybenzimidazolone polymers disclosed, none contain the hexafluoro substituent present in the instant application, nor does the patent disclose the instant process.

U.S. Pat. No. 4,537,974 discloses a diethynylated phenylbenzimidazole compound having the formula:

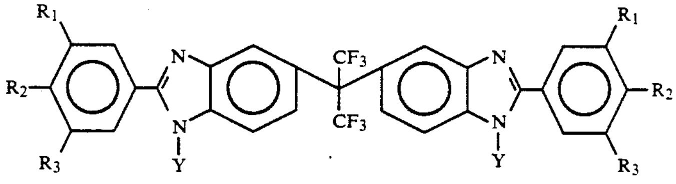

wherein Y is phenyl, cyclohexyl, adamantyl or phenoxylatedphenyl of the formula $C_6H_5(OC_6H_4)n$ (n=1 to 3) and where $R_1$, $R_2$ and $R_3$ are ethynyl, phenoxyethynyl, phenylethynyl, or hydrogen and further wherein at least one of said $R_1$, $R_2$ or $R_3$ is not hydrogen. This product is produced by the reaction of a hexafluoro substituted diaryl material with an aryl ethynyl material. While this reaction uses a hexafluoro material as a reactant, the hexafluoro material is significantly different from that used in the instant invention. In addition, the aryl ethynyl reactant is significantly different from the second reactant used in the instant process for the production of a substituted polybenzimidazolone polymers and the final product produced is also significantly different. See related U.S. Pat. No. 4,587,315.

A significant number of naphthoylene-based benzimidazoles which may or may not contain a hexafluoro substituent are disclosed in a number of chemical abstract articles. See, *Chemical Abstracts,* Vol. 96, 20, 96:862357c (1982): *Chemical Abstracts, Synthetic High*

*Polymers*, Vol. 96, 5, 96:20530h (1982); *Chemical Abstracts, Synthetic High Polymers*, Vol. 92, 9 92:77055d (1980); *Chemical Abstracts, Heterocycles*, Vol. 92, 609, 92:6465b (1980); *Chemical Abstracts, Plastics Manuf.* Vol. 90, 29, 90:169374u (1979); and *Chemical Abstracts, Plastic Manuf.*, Vol. 88, 31, 88:90478f (1978). While each of these articles disclose naphthoylene-based benzimidazoles wherein a possible substituent is a hexafluoro substituent, they fail to disclose the process of the instant invention, the types of hexafluoro compounds used in the instant process or the production of polybenzimidazolones.

U.S. Pat. No. 4,713,438 discloses a process for the production of certain polyimides containing $CF_3$ radicals within their structure. However, it fails to disclose the polybenzimidazolone polymers of the instant invention or suggest the use of 6F monomers for the preparation of polybenzimidazolone polymers.

Accordingly it is an object of the present invention to prepare novel hexafluoro polybenzimidazolone polymers.

It is a further object of this invention to prepare novel polybenzimidazolone polymers using hexafluoro tetraamines as a reactant.

It is a further object of this invention to prepare novel polybenzimidazolone polymers using hexafluoro tetraamines as a reactant that exhibit increased solubility over conventional polybenzimidazole polymers.

It is a still further object of this invention to prepare novel polybenzimidazolone polymers using hexafluoro tetraamines as a reactant which exhibit increased low temperature processibility over conventional polybenzimidazole polymers.

It is a still further object of this invention to prepare novel polybenzimidazolone polymers using hexafluoro tetraamines as a reactant which exhibit low moisture absorption, low flammability and long term thermal stability.

It is a still further object of this invention to prepare novel polybenzimidazolone polymers using hexafluoro tetraamines as a reactant which exhibit increased solvent resistance.

It is an additional object of this invention to prepare novel polybenzimidazolone polymers using hexafluoro tetraamines as a reactant which can be easily blended with other polymers to form useful composites.

These and other objects, as well as the scope, nature and utilization-of the process will be apparent to those skilled in the art from the following description and appended claims.

SUMMARY OF INVENTION

One or more objects of the present invention is accomplished by the preparation of a polymeric composition which is characterized by the recurring monomeric unit:

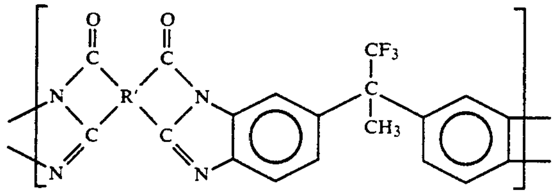

wherein R′ is a tetravalent aromatic nucleus with the

on each dianhydride ring paired on adjacent carbon atoms.

Another object of the present invention is the disclosure of a process for the production of aromatic polybenzimidazolone polymers prepared by reacting an aromatic hexafluorotetraamine compound with a dianhydride of an aromatic tetracarboxylic acid.

The polybenzimidazolone polymers based on hexafluoro aromatic tetraamines produced by the process of this invention can be formed into a wide range of products which show improved solubility, low temperature processibility, low moisture aborption, high thermal stability, resistance to solvents after curing, excellent mechanical properties, easy blending with other polymers, low dielectric constants, excellent electric properties and high temperature surface applications when compared t conventional polybenzimidazole polymers. In particular, these products may have significant use in the aerospace, composite and electronic industries. Also, these polymers would have excellent gas separation properties which would make them very useful as materials for the preparation/fabrication of gas separation membranes of various kinds/types.

DETAILED DESCRIPTION OF INVENTION

The hexafluoro starting material is preferably a hexafluoro aromatic tetraamine compound containing a pair of orthodiamino substituents on a biphenyl aromatic nucleus with the preferred hexafluoro tetraamine compound being 2,2′-bis-(3,4-diaminophenyl)-hexafluoro propane (hereinafter referenced to as "hexafluoro tetraamine"). Its structure is as follows:

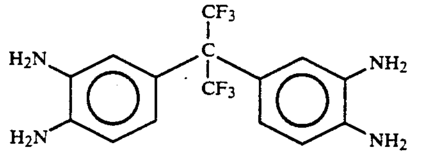

Various non-hexafluoro aromatic tetraamine compounds may also be mixed with the hexafluoro tetraamine compounds to produce various degrees of substitution.

The preferred aromatic hexafluorotetraamine starting material can be prepared by any conventional reaction scheme. In a preferred reaction, the aromatic hexafluorotetraamine material is prepared by the reaction of an aminophenol hexafluoropropane dissolved in acetic acid with an acetic anhydride to produce an acetylamino phenyl hexafluoropropane. This acetylaminophenyl hexafluoropropane is then dissolved in concentrated sulfuric acid, cooled to about 0° C. and treated with sulfamic acid to produce a nitroaminophenol hexafluoropropane. This nitroaminophenyl hexafluoropropane is then dissolved in solvent and hydrogenated by use of a conventional catalyst such as a palladium-on-carbon catalyst in an hydrogen environment under pressure to yield the tetraaminophenyl hexafluoropropane. The tetraaminophenyl hexafluoropropane material is purified by dissolving it in aqueous hydrochloric acid treated with activated charcoal and precipitating it in a hydroxide solution to yield the purified hexafluoro tetraamino biphenyl material.

Reacted with this hexafluoro tetraamine is a dianhydride of an aromatic carboxylic acid. Acceptable carboxylic acids include aromatic tetracarboxylic acids; aliphatic tetracarboxylic acids (preferably, those having 4 to 8 carbon atoms); and heterocyclic tetracarboxylic acids wherein the carboxyl groups are substituents upon carbon atoms in a ring compound such as pyridine, pyrazine, furan, quinoline, thiphene, and pyran.

The preferred dianhydrides are aromatic dianhydrides such as those illustrated below:

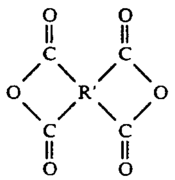

wherein R′ is a tetravalent aromatic nucleus with the

on each dianhydride ring being paired on adjacent carbon atoms. In a more preferred embodiment the dianhydrides are generally described as follows:

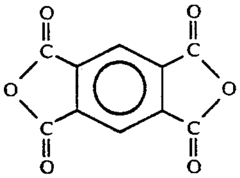

or

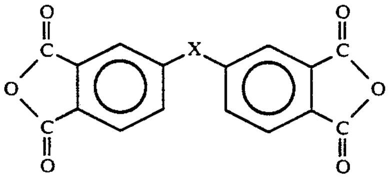

where X represents a single bond, -O-, -S-, $-SO_2-$,

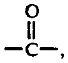

, a lower alkyl group such as $-(CH_2)_n$ (wherein n=1 to 10), $-(CF_2)_n$ (wherein n=1 to 10)

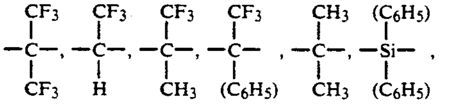

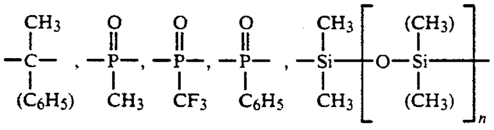

-continued wherein n = 1-4,

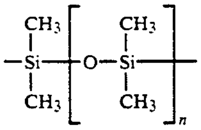

wherein n = 1 to 4, and

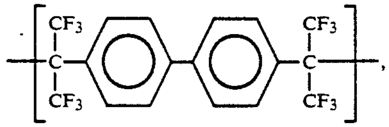

, and

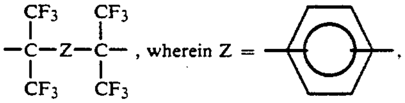

, or

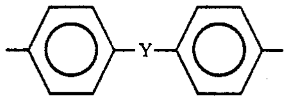

wherein Y = X.

The substituent between the two aromatic rings can also be represented by

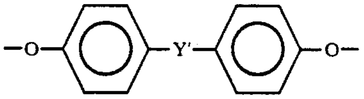

wherein Y′=X, or a direct bond and the like. The most preferred dianhydrides include biphenyl tetracarboxylic acid dianhydrides. The tetracarboxylic acid dianhydrides may also include hexafluoro substituted tetracarboxylic acid dianhydrides. The preferred hexafluoro dianhydride of a tetracarboxylic acid is hexafluoro 2′,2-bis(3,4-dicarboxyphenyl)hexafluoro propane dianhydride (6FDA), which is commercially available from Hoechst Celanese Corporation. In addition, various hexafluoro polybenzimidazolones can be prepared using combinations of hexafluoro-substituted dianhydrides and non-hexafluoro-substituted dianhydrides.

An aromatic tetracarboxylic acid or combination of aromatic tetracarboxylic acids may be substituted for the dianhydride of an aromatic carboxylic acid. Acceptable tetracarboxylic acids include those previously discussed. In a preferred embodiment, the tetracarboxylic acids are generally described as follows:

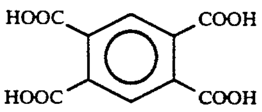

and

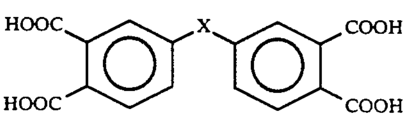

wherein X represents a direct bond,

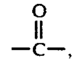

,

-O-, -S-, $-SO_2-$, a lower alkyl group such as $-(CH_2)_n$ (wherein n=1 to 10), $-(CF_2)_n$ (wherein n=1 to 10),

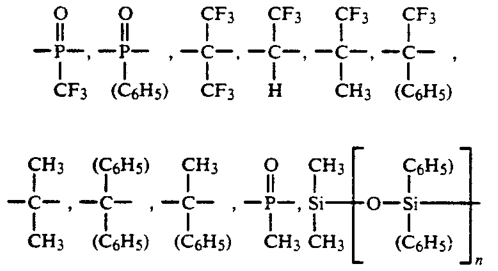

wherein n = 1 to 4,

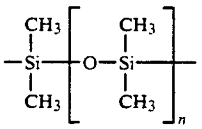

wherein n = 1 to 4, and

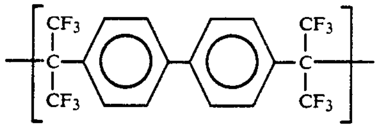

The substituent between the two aromatic rings can also be represented by

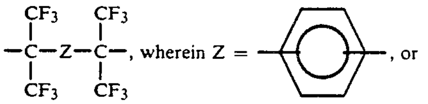

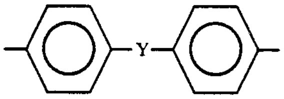

The substituent between the two aromatic rings can also be represented by

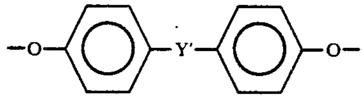

wherein Y and Y'=X, or a direct bond and the like.

Any conventional process known to those skilled in the art may be employed to prepare the polybenzimidazolone polymer based on aromatic hexafluoro tetraamines. It is preferred to react the dianhydride of an aromatic dicarboxylic acid at a ratio of about 1 mole per mole of the aromatic hexafluoro tetraamine. However, in order to obtain a product having an optimum viscosity, it is advantageous to employ up to an excess (0.25 mole percent)of the dianhydride of the aromatic dicarboxylic acid to the aromatic hexafluoro tetraamine reactant. The hexafluoro tetraamine can be blended with conventional non-hexafluoro tetraamines in various quantities to create copolymers with varying percentages of hexafluoro-isopropyledene moieties. The aromatic hexafluoro tetraamine and the dianhydride compound are introduced into the reaction zone and heated therein at a temperature above about 200° C., preferably from about 200° C. to about 320° C. The reaction is conducted in a substantially oxygen-free atmosphere, i.e., below about 20 ppm oxygen and preferably below about 8 ppm oxygen. Usually the first stage of reaction is continued until a prepolymer is formed having an inherent viscosity, of at least about 0.03 dl/g (determined from a solution of 0.4 grams of the polymer in 100 milliliters of 97 percent $H_2SO_4$ at 25° C.). During this first stage heating process, preferably the reactants are agitated by conventional agitation procedures.

After the conclusion of the first stage reaction, which normally takes about 0.5 hours to about 3 hours and preferably about from about 1 to 3 hours, the prepolymer product is cooled and pulverized. The prepolymer is then introduced into a second stage polymerization reaction zone where it is heated under substantially oxygen-free conditions to yield the polybenzimidazolone polymer using the aromatic hexafluoro tetraamine product as a reactant, desirably with an inherent viscosity of at least about 0.06 dl/g (determined from a solution of 0.4 grams of the polymer in 100 milliliters of 97 percent $H_2SO_4$ at 25° C.).

The temperature employed in the second stage reaction is at least about 250° C. and preferably from about 275° C. to about 450° C. The second stage reaction generally takes at least about 0.5 hours and preferably about 1.0 hour or more. (The polymer may also be produced by a one step reaction although the previously described two step process is preferred.)

The following generalization equation illustrates the condensation reaction which occurs in forming the hexafluoro polybenzimidazole polymer:

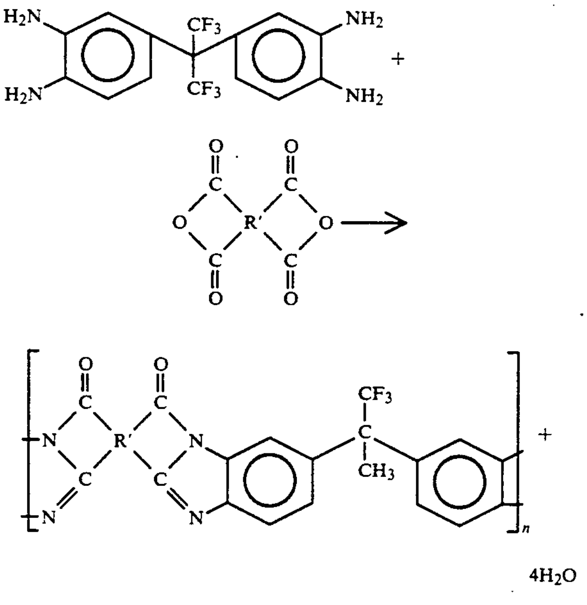

wherein R' is as previously defined.

The particularly preferred hexafluoro polybenzimidazole polymer prepared by the process of the present invention is as characterized by the recurring unit:

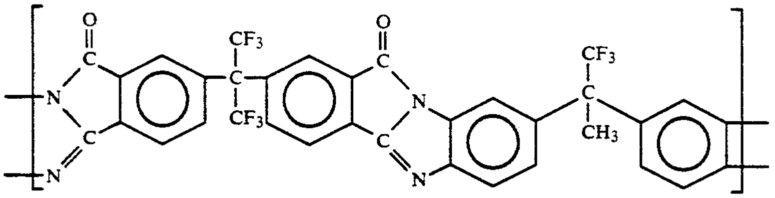

The illustrated polymer can be prepared in accordance with the present invention process by the reaction of 2,2'-bis-(3,4-diaminophenyl) hexafluoro propane with 2,2'-bis-(3,4-dicarboxyphenyl) hexafluoro propane dianhydride.

The following examples are given as specific illustrations of the invention. All parts and percentages are by weight unless otherwise stated. It is understood however, that the invention is not limited specific details set forth in the examples.

EXAMPLE 1

In a conventional 1000 ml three necked, round bottom flask fitted with a heating mantle, thermometer, addition funnel, condenser and a nitrogen blanket was placed 27.5 parts of 2,2'-bis-(4-aminophenyl)-hexafluoropropane dissolved in 100 parts of acetic acid. 18.5 parts of acetic anhydride was slowly added to the solution at 30° C. and the solution was stirred for several hours. Approximately twice the volume of the solution in water was added to the reaction vessel. The acetylated diamine was isolated by filteration, washed with water and air dried to produce 34.4 parts of 2,2-bis-(4-acetylaminophenyl)hexafluoropropane.

This material was then dissolved in 400 parts of 93 percent sulfuric acid in a 2000 ml round bottom flask fitted with a heating mantle, thermometer, addition funnel, condenser and a nitrogen blanket and then cooled to a temperature of 0° C. to 5° C. 17 parts of 70 percent nitric acid were added over a period of one hour and then stirred for an additional hour. 3 parts of sulfamic acid were added to the reaction solution followed by the slow addition of 50 parts of water. The solution was heated at 60° C. to 70° C. for about 6 hours and then drowned with about 2000 parts of water and ice in a 4000 ml beaker fitted with a mechanical stirrer. The slurry was then filtered and the product washed with water, and dried in an oven to produce 34.8 parts of 2,2-bis-(3-nitro-4-aminophenyl)-hexafluoropropane.

This material was then dissolved in 150 parts of methanol in a 250 ml pressure-tested Pyrex bottle and hydrogenated over 1.5 parts of a 5 percent palladium-on-carbon catalyst under 3 to 4 atmospheres of hydrogen at about 50° C. When the hydrogen uptake stopped, the mixture was cooled, the catalyst was filtered off and the filterate was combined with about 500 parts of water and ice in a 1000 ml beaker fitted with a mechanical stirrer. The mixture was then filtered, water washed and dried at room temperatures to yield 27 parts of 2'2-bis-(3-4-diaminophenyl)-hexafluoropropane. This material was then purified by dissolving it in 50 parts of aqueous hydrochloric acid, filtering it through activated charcoal and repreciptating it with 50 parts of ammonium hydroxide to yield purified 2,2'-bis-(3,4-diaminophenyl)-hexafluoropropane as a white powder.

EXAMPLE 2

Into a three necked flask equipped with a nitrogen inlet and outlet, a heating mantle, thermometer, addition funnel mechanical stirrer, temperature controller/timer and a condenser were placed 3.68 gms of 2,2'-bis(3,4-diaminophenyl)-hexafluoropropane and 7.961 gms of 4,4-bis[2-(3,4-dicarboxyphenyl) hexafluoro isopropyl] diphenyl dianhydride. The flask was degassed and then filled with nitrogen. The degassing was repeated three times. The mixture was heated rapidly with stirring to 320° C. for 2 hours. The resulting product was then cooled to room temperature and then ground.

The ground prepolymer was placed in a flask and after degassing was repeated, the prepolymer was heated at 350° C. for 2 hours. The resulting hexafluoro polybenzimidazolone exhibited an inherent viscosity of 0.1 dl/gm when measured in a concentration of 0.4 gm of the hexafluoro polybenzimidazolone in 100 ml of 97 percent sulfuric acid at 25° C. The polymer had a glass transition temperature (Tg) of 325° C. determined by differential scanning calorimetry (DSC) using a DuPont 910 DSC connected to a DuPont 1090 thermal analyzer operating at a 20° C./min. heating rate with nitrogen purge gas having a flow rate of 60 cc/min., and a 5 percent weight loss measured at 490° C. determined by thermogravemetric analysis (TGA) using a DuPont 951 TGA connected to a DuPont 1090 thermal analyzer operating at a heating rate of 20° C./min using air as a purge gas with a flow rate of 40 cc/min.

EXAMPLE 3

Into a three necked flask equipped with a nitrogen inlet and outlet, a mechanical stirrer a Deans Stark trap, thermometer, thermal/watch/timer, heating mantle and a condenser were placed 3.68 gms of 2,2'-bis(3,4,-diaminophenyl) hexafluoropropane and 3.10 gms of 2,2'-bis(3,4-dicarboxyphenyl) ether dianhydride. The flask was degassed and then filled with nitrogen. The degassing was repeated three times. The mixture was heated rapidly with stirring to 320° C. for 1 hour. The resulting product was then cooled to room temperature and then ground.

The ground prepolymer was placed in a flask and after degassing was repeated, the prepolymer was heated at 350° C. for 2 hours. The resulting hexafluoro polybenzimidazolone exhibited an inherent viscosity of 0.1 dl/gm when measured in a concentration of 0.4 gm of the hexafluoro polybenzimidazolone in 100 ml of 97 percent sulfuric acid at 25° C. The polymer had a 5 percent weight loss measured at 485° C. by thermogravemetric analysis (TGA) using a DuPont 951 TGA connected to a DuPont 1090 thermal analyzer operating at a heating rate of 20° C./min. using air as a purge gas at a flow rate of 40 cc/min.

EXAMPLE 4

In a three necked flask equipped with a nitrogen inlet and outlet, a heating mantle, thermometer, addition funnel mechanical stirrer, temperature controller/timer and a condenser were placed 4.6 gms of 2,2'-bis(3,4-diaminophenyl) hexafluoro propane and 5.55 gms of 2,2-bis(3,4-dicarboxyphenyl) hexafluoro propane dianhydride. The flask was degassed and then filled with nitrogen. The degassing was repeated three times. The mixture was heated rapidly with stirring to 320° C. for 2 hours. The resulting product was then cooled to room temperature and then ground.

The ground prepolymer was placed in a flask and after degassing was repeated, the prepolymer was heated at 350° C. for 2 hours. The resulting hexafluoro polybenzimidazolone exhibited an inherent viscosity of 0.21 dl/gm when measured at a concentration of 0.5 gm of the hexafluoro polybenzimidazolone in 100 ml of N-methylpyrrolidone at 25° C. The polymer had a 5 percent weight loss measured at 500° C. determined by thermogravemetric analysis (T.G.A.) using a DuPont 951 TGA connected to a DuPont 1090 thermal analyzer operating at a heating rate of 20° C./min. using air as a purge gas at a flow rate of 40 cc/min.

EXAMPLE 5

Into a three necked flasked equipped with a nitrogen inlet and outlet, a heating mantle, thermometer, addition funnel mechanical stirrer, temperature controller/-time and a condenser were placed 3.68 gms of 2,2'-bis(3,4-diaminophenyl)-hexafluoropropane and 4.76 g of 2,2'-bis(3,4-dicarboxyl phenyl) hexafluorpropane tetraacid. The flask was degassed and then filled with nitrogen. The degassing was repeated three times. The mixture was heated rapidly with stirring to 340° C. for 2 hours. The resulting product was then cooled to room temperature and then ground.

The ground prepolymer was placed in a flask and after degassing was repeated, the prepolymer was heated at 350° C. for 2 hours. The resulting hexafluoro polybenzimidazolone exhibited an inherent viscosity of 0.1 dl/gm when measured at a concentration of 0.4 gm of the hexafluoro polybenzimidazolone in 100 ml of 97 percent sulfuric acid at 25° C. The polymer had a 5 percent weight loss measured at 470° C. determined by thermogravemetric analysis (TGA) using a DuPont 951 TGA connected to a DuPont 1090 thermal analyzer operating at a heating rate of 20° C./min. using air as a purge gas at a flow rate of 40 cc/min.

We claim:

1. A polymeric composition having recurring units of the formula:

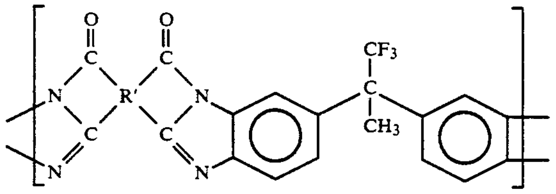

wherein R' is a tetravalent aromatic nucleus with the

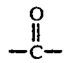

on each dianhydride ring being paired on an adjacent carbon atom.

* * * * *